2,753,945

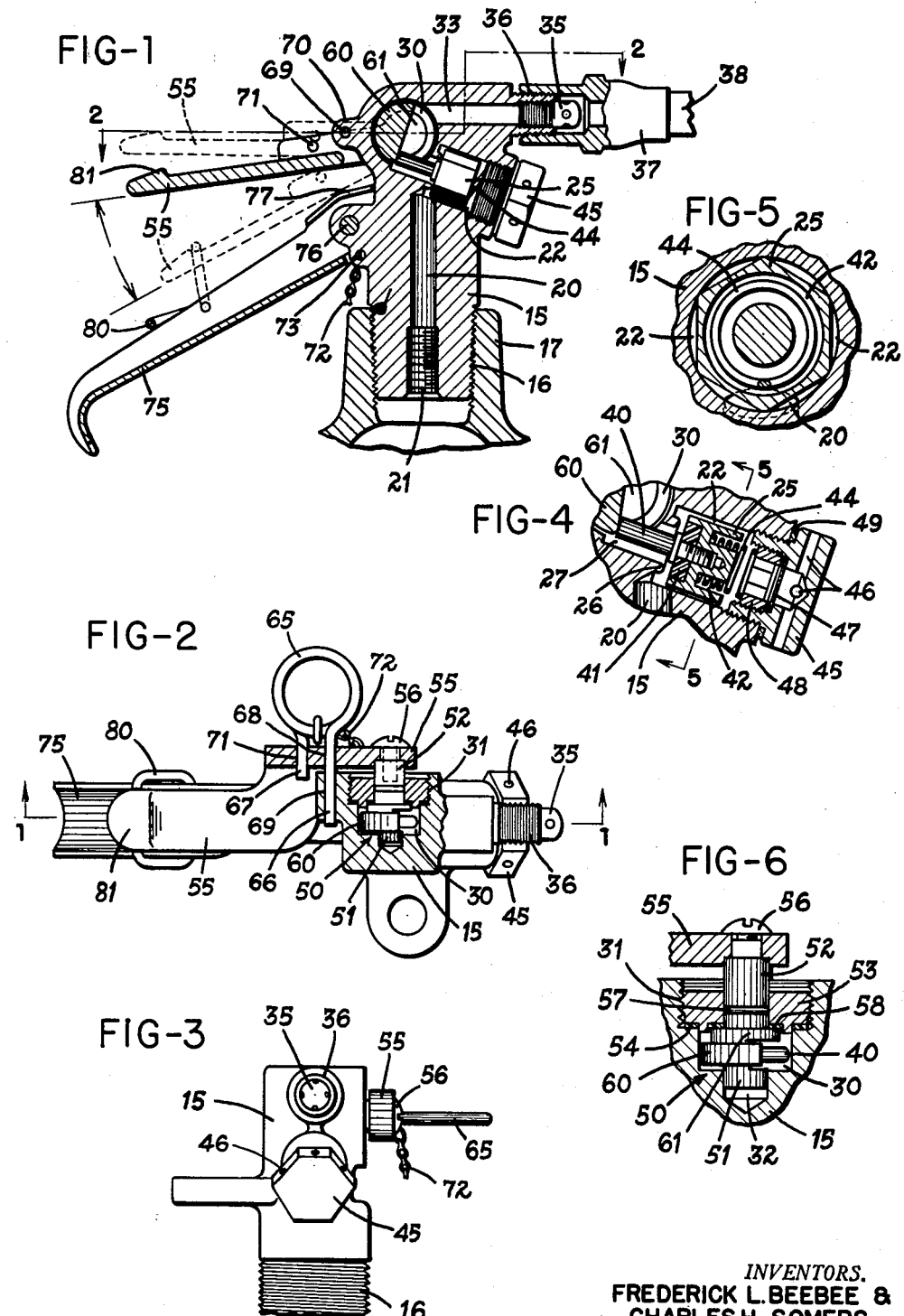
July 10, 1956 — F. L. BEEBEE ET AL — 2,753,945
VALVE FOR PRESSURIZED FIRE EXTINGUISHERS
Filed Oct. 16, 1952 — 2 Sheets-Sheet 1
INVENTORS.
FREDERICK L. BEEBEE &
CHARLES H. SOMERS
BY Marechal Biebel French & Bugg
ATTORNEYS July 10, 1956 F. L. BEEBEE ET AL 2,753,945
VALVE FOR PRESSURIZED FIRE EXTINGUISHERS
Filed Oct. 16, 1952 2 Sheets-Sheet 2
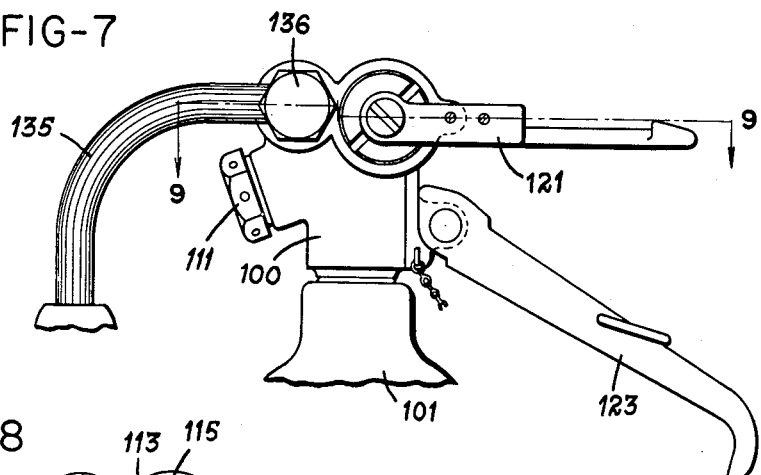
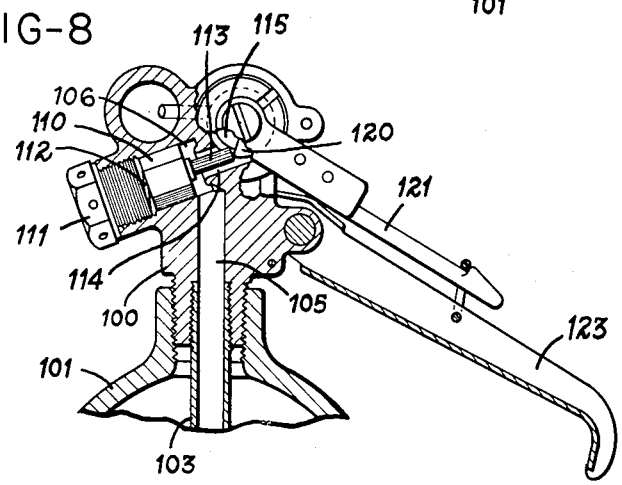
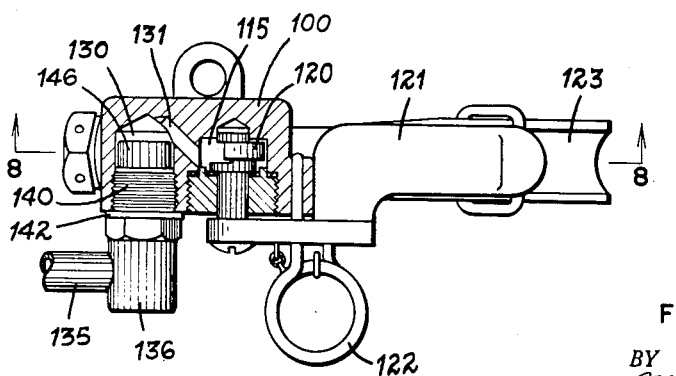
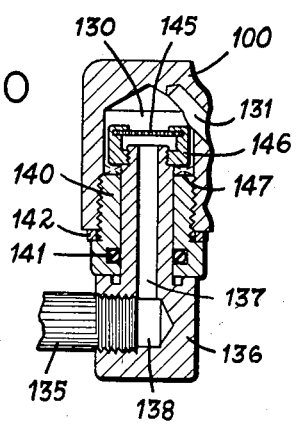
INVENTORS.
FREDERICK L. BEEBEE &
CHARLES H. SOMERS
BY
ATTORNEYS United States Patent Office 2,753,945
Patented July 10, 1956

VALVE FOR PRESSURIZED FIRE EXTINGUISHERS

Frederick L. Beebee, Manhattan Beach, Calif., and Charles H. Somers, Dayton, Ohio, assignors to The Fyr-Fyter Company, Dayton, Ohio, a corporation of Ohio Application October 16, 1952, Serial No. 315,112

4 Claims. (Cl. 169—31)

This invention relates to a discharge valve assembly especially adapted for use with fire extinguishers of the pressurized type and like containers of fluid under gas pressure.

One of the principal objects of the invention is to provide such a discharge valve assembly which is simple to manufacture and assemble, which is safe and reliable under both storage and operating conditions, and which is convenient and easy to operate with minimum requirements of physical effort on the part of the user.

Another object is to provide a discharge valve assembly which is at all times effectively sealed against undesired escape of pressure fluid other than through the proper outlet when the valve is open, and more particularly to provide such a valve assembly wherein the only moving part projecting from the interior of the valve body to the outside is a rotary member which is readily sealed against escape of the pressure fluid therepast without interfering with smooth operation.

An additional object of the invention is to provide a discharge valve assembly as outlined above wherein unseating movement of the valve member which controls discharge is effected by means of a crank unit having a relatively short operating arm within the valve body and a much longer handle portion located outside the valve body for manual operation with comparatively little effort by the user.

A further object is to provide a discharge valve assembly as outlined above wherein the valve operates in a valve chamber formed by a bore separate from and obliquely arranged with respect to the inlet and outlet passages of the valve body, wherein the outer end of the valve chamber is closed by a plug unit which includes a frangible safety disk, and wherein the valve is of lesser cross-sectional area than the valve chamber to provide constant access for the pressure fluid in the fire extinguisher to the outer end of the valve chamber so that such pressure fluid will maintain seating pressure on the valve while closed and at all times be in contact with the safety disk so that the disk may rupture in the event that the pressure becomes too high.

It is also an object of the invention to provide a discharge valve assembly of the above type wherein the valve body is entirely free of through bores and in which the inlet and outlet passages and the operating parts of the assembly are formed by or housed in a plurality of separate bores each arranged in predetermined angular relation with the others for ready manufacture and maintenance of the unit.

Additional objects and advantages of the invention will be apparent from the following description, the accompanying drawings and the appended claims.

In the drawings—

Fig. 1 is a sectional view on the line 1—1 of Fig. 2 showing a discharge valve assembly constructed in accordance with the invention and with the valve in closed position;

Fig. 2 is a view looking downwardly in Fig. 1 which is partly in elevation and partly in section on the line 2—2 of Fig. 1;

Fig. 3 is an elevational view looking from left to right in Fig. 1;

Fig. 4 is an enlarged fragment of Fig. 1 showing the safety plug and valve in section and with the valve in opened position;

Fig. 5 is a further enlarged fragmentary section on the line 5—5 of Fig. 4;

Fig. 6 is an enlarged fragment of Fig. 2;

Fig. 7 is a side elevational view of another form of discharge valve assembly constructed in accordance with the invention;

Fig. 8 is a view partly in side elevation and partly in section on the line 8—8 of Fig. 9 showing the valve in open position and with parts removed;

Fig. 9 is a view on the line 9—9 of Fig. 7; and

Fig. 10 is an enlarged sectional fragment of Fig. 9.

Referring to the drawings, which illustrate preferred embodiments of the invention, in the form of the discharge valve assembly shown in Figs. 1–6, the valve body 15 is threaded at 16 for attachment to the neck 17 of a container adapted to receive a quantity of highly compressed fire extinguisher fluid, such as liquid carbon dioxide, and the inlet bore 20 in the lower end of the valve body is tapped at 21 to receive the usual pickup tube. The bore 20 extends vertically approximately at the center of the valve body and connects at its open upper end with a second and larger bore 22 which extends into the valve body at an oblique angle with respect to bore 20, satisfactory results having been obtained with this angle approximately 70° as shown. This bore 22 forms the valve chamber for the poppet valve 25 and is provided with an annular shoulder 26 at its inner end forming a seat for valve 25. A passage 27 leads through the center of the valve seat 26 into a third bore 30 which extends into the valve body at substantially right angles to the plane defined by bores 20 and 22.

The bore 30 is provided with a counterbored and tapped outer portion 31 and a smaller inner end portion 32. A fourth bore 33 extends into the upper end of the valve body 15 at substantially right angles to bore 20 and in the same plane with bores 20 and 22; bore 33 connects directly at its inner end with the upper part of bore 30 and through bore 30 with passage 27. Bore 33 forms the outlet passage of the valve body and is tapped at its outer end to receive a diffuser 35, and the adjacent outer end portion of the valve body is threaded at 36 to receive a connecting fitting 37 on a discharge line 38.

The valve 25 includes a valve stem 40 of substantially lesser diameter than passage 27 to extend freely therethrough, and the inner end of valve 25 is provided with a suitable gasket 41 adapted to seal in contact with valve seat 26, satisfactory results having been obtained with this gasket formed of the polytetrafluoroethylene material sold commercially under the tradename Teflon. The outer end of valve 25 has an annular recess 42 receiving one end of a compression spring 44 arranged to urge the valve to seated position, and the outer end of bore 22 is closed by a safety plug 45 which is threaded therein and includes vent passages 46 normally closed by a safety disk 47 held in place by a tubular safety screw 48 which also forms a seat for the outer end of spring 44. The disk 47 is adapted to be ruptured if the pressure within the shell 17 exceeds a predetermined value, and as clearly shown in Fig. 5, the valve 25 is hexagonal or otherwise of substantially lesser cross-sectional area than bore 22 to provide clearance for the pressure fluid within the shell to the outer end of the valve chamber in order to assure a constant pressure connection between disk 47 and the interior of the container and also to apply and maintain this pressure against the outer end of the valve to supplement the seating action of spring 44. The plug 45 is shown as provided with a gasket 49 of copper or other suitable material.

The bore 30 forms a housing for certain of the operating means for unseating valve 25. Referring particularly to Figs. 2 and 6, a cam member indicated generally at 50 includes a stub shaft portion 51 journaled in the bore portion 32 and a longer shaft portion 52 extending rotatably through a retaining screw 53 threaded into counterbore 31 and provided at its inner end with a gasket 54 of suitable material such as the Teflon material noted above. The outer end of shaft 52 includes a non-circular portion forming a keyed connection with the outside operating handle 55 and is secured thereto by a screw 56. The shaft 52 is circumferentially groove near its inner end to receive an O-ring 57 providing a rotary seal with respect to retaining screw 53, and the inner end of screw 53 is counterbored to receive a low friction thrust washer 58 which is also preferably of the above noted Teflon material.

The cam member 50 also includes a cam 60 which operates within bore 30 and is of segmental shape with its outer surface cylindrically curved concentric with bore 30 but of sufficiently smaller diameter for free rotation therein, and cam 60 is also of substantially lesser angular extent than bore 30, being shown as approximately semi-cylindrical, to leave a major portion of bore 30 open. One radially outer end of cam 60 is adapted to engage the inner end of valve stem 40, and thus when member 50 is rotated with respect to the valve body, the cam 60 moves with a crank action against valve stem 40 to shift the valve away from the valve seat 26 and thus to open passage 27 for flow of pressure fluid from the inlet bore 20 and valve chamber 22. This fluid will then flow through the portion of bore 30 left open by the segmental shape of the cam to the inner end of outlet bore 33 for free discharge from the valve body. It will also be noted that the cam member 50 includes a cylindrical portion 61 between the cam 60 and the shaft portion 52 which form a thrust bearing surface with respect to the gasket or washer 58.

The extended construction of the operating handle 55 provides a correspondingly increased mechanical advantage with respect to the comparatively short crank arm formed by the cam 60, so that opening of the valve is smooth and requires little effort by the operator. Also, a simple lock is provided for retaining handle 55 in inoperative position and includes a lock pin 65 formed of spring wire coiled in such manner that its two ends 66 and 67 normally diverge at a small included angle, such as about 10°. One end 66 of the lock pin is adapted to be received in a hole 68 in handle 55 and another hole 69 in a boss 70 on the valve body. These holes are so correlated with the internal parts of the unit that when they are in line, the cam 60 is rotated out of contact with valve stem 40 to assure proper seating of the valve, and boss 70 also serves as a stop limiting upward movement of handle 55 to the proper position aligning holes 68 and 69. The other end 67 of the lock pin is shorter than end 66 and is adapted to be received in a hole 71 in handle 55, and the holes 71 and 68 are so spaced as to require deflection of the pin ends to substantially parallel relation for entry therein in order to establish a yieldable locking action against the tension of the coiled portion of the lock pin. A chain 72 is shown for loosely attaching lock pin 65 to the valve body at 73.

The valve body 15 is also provided with a carrying handle 75 for the fire extinguisher which is fastened thereon by pin 76 and includes a top portion 77 adapted to abut the side of the valve body to limit upward movement of handle 75 thereon. The handles 55 and 75 are arranged to facilitate operation of the fire extinguisher by utilizing both handles to establish a squeeze grip in operating the valve, thus making it simpler for the user to open the valve with one hand. In addition, means are provided for latching the two handles together with the valve held in open position to facilitate manipulation of the extinguisher in use. For this purpose, the handle 75 carries a loop member 80 pivoted thereon and adapted to swing over the outer end of handle 55, and a boss 81 near the outer end of handle 55 serves as a keeper for latch 80 when the parts are latched together as shown in dotted lines in Fig. 1.

The upper dotted line position of handle 55 in Fig. 1 shows the locked position of the valve in which cam 60 is out of contact with valve stem 40, and to operate the extinguisher, it is only necessary to pull out lock pin 65 and squeeze handles 55 and 75 together. As soon as the lock pin is removed, handle 55 will drop to its full line position in Fig. 1 causing cam 60 to engage valve stem 40. Downward pressure on handle 55 will then open the valve to the position shown in Fig. 4, thereby permitting the desired free flow of fire extinguishing fluid around valve seat 26 and through passage 27 to bores 30 and 33 for discharge. The handle 55 can be held manually in this release position, or the two handles 55 and 75 may be latched together as described for continued operation of the extinguisher.

It will accordingly be seen that this valve assembly has a desirable easy and positive operating action while at the same time being simple to construct and maintain. With the valve arranged as shown so that no parts thereof extend outwardly from the valve body, it is possible to employ the safety plug 45 as the sealing member for the outer end of the valve chamber, and thus inspection of both the safety seal and the valve itself can be accomplished at the same time upon removal of the single plug. Another advantage of the present valve assembly derives from the provision of the crank type operating unit, since the only part of this mechanism projecting to the outside of the valve body is the rotary shaft which requires only a rotary seal of relatively simple construction offering minimum resistance to operation, and there is no necessity for packing of more complicated types such as are required for sealing around sliding or otherwise reciprocating parts.

Figs. 7–10 show a discharge valve assembly in accordance with the invention which is intended primarily for use on fire extinguishers of smaller size. The valve body 100 is threaded into the container 101, and the pickup tube 103 is shown as threaded into the lower end of the inlet bore 105. The bore 106 corresponds with the bore 22 as described and is similarly arranged at an oblique angle to and connecting with the inlet bore 105. The bore 106 forms the valve chamber for the valve 110, which is shown as identical in construction with valve 25, and the outer end of bore 106 is closed by a safety plug unit 111 similarly identical with the plug 45 and its associated parts. The valve 110 is provided with a spring 112 corresponding to the spring 44, and its valve stem 113 extends through a larger passage 114 into a bore 115 corresponding with the bore 30 in the other valve body as described.

The cam member identified generally as 120 is shown as identical in construction with the cam member 50, and it operates in the same manner as the cam member 50 in conjunction with its operating handle 121, which is provided with a lock pin 122 corresponding to the lock pin 65, and the carrying handle 123 is essentially the same in construction and arrangement as the handle 75 of the other valve unit. The outlet passage for the valve assembly includes a bore 130 extending into the valve body in spaced and parallel relation with the bore 115, and the bores 115 and 130 are connected by an oblique passage 131. Thus when the cam 120 is rotated by its handle 121, the valve 110 is shifted to open position providing for direct flow of the fire extinguishing fluid from inlet bore 105 through the inner end of bore 110 and passage 114 into bore 115, and thence by way of passage 131 to outlet bore 130.

Figs. 9 and 10 show the valve assembly provided with a swivel unit forming the connection for the discharge tube 135. This connection includes a swivel rotor 136 having connecting right angled bores 137 and 138 therein, the outer bore 138 being tapped to receive one end of discharge tube 135. The swivel rotor 136 is rotatably mounted in the swivel body 140 which is in turn threaded into the tapped outer end of bore 130 and is provided with an O-ring 141 sealing around swivel rotor 136 and a gasket 142 sealing against the exterior surface of the valve body. The inner end of this swivel unit carries a screen 145, of wire mesh or the like, which is carried by a retaining collar 146 threaded on the adjacent end of swivel rotor 137 against a spring washer 147.

It will be seen that this valve assembly operates in essentially the same manner as described in connection with the valve assemblies of Figs. 1–6, and further that it includes the same advantages of simple construction as well as easy and positive operation. In addition, the main operating parts such as the valve, the cam unit, and their associated sealing members can be of identical construction and size and may therefore be used interchangeably in valve bodies of different sizes, thus affording further economies of construction.

While the forms of apparatus herein described constitutes preferred embodiments of the invention, it is to be understood that the invention is not limited to these precise forms of apparatus, and that changes may be made therein without departing from the scope of the invention which is defined in the appended claims.

What is claimed is:

1. In a fire extinguisher including a container adapted to be charged with liquified gaseous extinguishing fluid under pressure, a discharge head assembly comprising a valve body, means for connecting the lower end of said body to said container, a carrying handle for said extinguisher projecting from one side of said valve body, means defining an inlet bore extending partially through said valve body and opening into said container, said valve body having an outlet bore extending partially therethrough at an angle to said inlet bore and terminating in spaced relation with said inlet bore, said valve body having a third bore extending partially therethrough in oblique relation with said inlet bore and defining a valve chamber connecting with the inner end of said inlet bore, means at the inner end of said valve chamber forming a valve seat, said body having a fourth bore extending partially therethrough in substantially perpendicular relation with said valve chamber and connecting with the inner end of said outlet bore, said fourth bore extending substantially at right angles to said carrying handle, means defining a connecting passage leading from said valve chamber through said valve seat and into said fourth bore, a valve reciprocable in said valve chamber, a closure for the outer end of said valve chamber, means for biasing said valve against said seat, a stem on said valve extending through said passage into said fourth bore, a shaft mounted for rotation within said fourth bore, an operating handle for rotating said shaft projecting generally radially therefrom above said carrying handle to rotate said shaft while requiring location of the hand of the operator away from and out of line with said shaft to prevent injury thereto by fluid leaking from between said shaft and the walls of said fourth bore, and cam means on said shaft within said fourth bore for engagement with said valve stem upon rotation of said operating handle to open said valve for free passage of fluid from said inlet into said valve chamber and through said passage and said fourth bore into said outlet bore.

2. A discharge head assembly for a fire extinguisher as defined in claim 1 comprising a closure plug for the outer end of said valve chamber having a vent passage therethrough, a rupturable safety disk for closing said vent passage, and means securing said disk to said plug for removal therewith as a unit to provide for direct removal and replacement of said valve through the resulting open end of said valve chamber.

3. A discharge head assembly for a fire extinguisher as defined in claim 1 comprising three portions of progressively reduced diameters in said fourth bore with the middle said portion aligned with said connecting passage from said valve chamber and forming a cam chamber, said shaft having the inner end portion thereof of small diameter and journaled in the inner said portion of said fourth bore, an annular plug threaded into the outer said portion of said fourth bore with said shaft journaled therein, means cooperating with said plug and said shaft to seal said fourth bore, said cam means being of segmental shape and of lesser radius and angular extent than said cam chamber for rotation with said shaft against said valve stem to open said valve for free flow of fluid from said inlet bore and valve chamber through said passage and cam chamber to said outlet bore, and means for locking said operating handle to said body with said cam in predetermined out-of-contact relation with said valve stem to prevent interference with said cam with proper seating of said valve by said biasing means.

4. In a fire extinguisher including a container adapted to be charged with a liquified gaseous extinguishing fluid under pressure, a discharge head assembly comprising a valve body, means for connecting the lower end of said body to said container, a carrying handle for said extinguisher projecting from one side of said valve body, means defining an inlet bore extending partially through said valve body and opening into said container, said valve body having an outlet bore extending partially therethrough and terminating in spaced relation with said inlet bore, said valve body having a third bore extending partially therethrough and defining a valve chamber connecting with the inner end of said inlet bore, means at the inner end of said valve chamber forming a valve seat, said body having a fourth bore extending partially therethrough and connecting with the inner end of said outlet bore, said fourth bore including three portions of progressively reduced diameters with the middle said portion aligned with said valve chamber and forming a cam chamber, said fourth bore extending substantially at right angles to said carrying handle, means defining a connecting passage leading from said valve chamber through said valve seat and into said cam chamber, a valve reciprocable in said valve chamber and including a stem extending through said passage into said cam chamber, a shaft located in said fourth bore and having the inner end portion thereof of small diameter and journaled in the inner said portion of said fourth bore, an annular plug threaded into the outer said portion of said fourth bore with said shaft journaled therein, means cooperating with said plug and said shaft to seal said fourth bore, an operating handle on the outer end of said shaft for rotating said shaft, said operating handle projecting generally radially from said shaft in vertical alignment with asid carrying handle for movement toward and away therefrom to require location of the operator's hand away from and out of line with said shaft to prevent injury thereto by fluid leaking from between said shaft and the walls of said fourth bore, and a cam of segmental shape on said shaft in said cam chamber and of lesser radius and angular extent than said cam chamber for rotation with said shaft against said valve stem to open said valve for free flow of fluid from said inlet bore and valve chamber through said passage and cam chamber to said outlet bore.

References Cited in the file of this patent

UNITED STATES PATENTS

| | | |
|---|---|---|
| 22,402 | Robbins | Dec. 21, 1858 |
| 970,082 | Morehead | Sept. 13, 1910 |
| 1,010,912 | Holtzman | Dec. 5, 1911 |
| 1,173,672 | Macloskie | Feb. 29, 1916 |
| 1,228,453 | Lehnert | June 5, 1917 |
| 1,563,916 | Nieberding | Dec. 1, 1925 |
| 1,650,481 | Balzano | Nov. 22, 1927 |
| 2,255,774 | Huffman | Sept. 16, 1941 |
| 2,383,961 | Freygang | Sept. 4, 1945 |
| 2,500,214 | Stroop | Mar. 14, 1950 |
| 2,520,976 | Stroop | Sept. 5, 1950 |
| 2,537,798 | Smith | Jan. 9, 1951 |

FOREIGN PATENTS

| | | |
|---|---|---|
| 702,095 | Germany | Jan. 30, 1941 |
| 525,713 | Great Britain | of 1940 |
| 477,655 | Canada | of 1951 |